(12) United States Patent
Maeda et al.

(10) Patent No.: US 6,654,547 B1
(45) Date of Patent: Nov. 25, 2003

(54) DVD RENTAL SYSTEM AND METHOD

(75) Inventors: Kazuki Maeda, Neyagawa (JP); Hidetaka Fukae, Mino (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 464 days.

(21) Appl. No.: 09/702,807

(22) Filed: Nov. 1, 2000

(30) Foreign Application Priority Data

Nov. 2, 1999 (JP) .............................................. 11-312630

(51) Int. Cl.[7] .............................................. H04N 5/781
(52) U.S. Cl. ........................ 386/125; 386/125; 369/14; 369/275.2; 369/275.4
(58) Field of Search ...................... 386/1, 45, 111–112, 386/125–126; 369/30.19, 111, 126, 14, 275.2, 275.3, 275.4, 275.5; H04N 5/76, 9/79, 5/781

(56) References Cited

U.S. PATENT DOCUMENTS 5,150,339 A * 9/1992 Ueda et al. .................... 369/32
6,466,735 B1 * 10/2002 Kozuka et al. ............. 386/126

* cited by examiner

*Primary Examiner*—Thai Tran
(74) *Attorney, Agent, or Firm*—Wenderoth, Lind & Ponack, L.L.P.

(57) ABSTRACT

A digital versatile disc (DVD) includes a read-only ROM area in which video is previously recorded, and a readable/writable RAM area. A lender DVD apparatus writes a playback/recording control program in the RAM area of the DVD to be rented. A user DVD apparatus reads the playback/recording control program from the RAM area of the rented DVD. Following the playback/recording control program, the user DVD apparatus receives digital broadcasting, extracts commercial messages therefrom, and writes the extracted commercial messages in the RAM area. Then, the user DVD apparatus reads the video from the ROM area and the commercial messages from the RAM area for playback. Then, the user DVD apparatus generates history data indicating how many times and which commercial message has been played-back, and writes the generated history data in the RAM area.

12 Claims, 7 Drawing Sheets

DVD RENTAL SYSTEM AND METHOD

BACKGROUND OF THE INVENTION

1. Field of the Invention

The present invention relates to DVD (Digital Versatile Disc) rental systems and methods, and more specifically, to a DVD rental system and method for recording video and sound on a DVD, and lending the DVD to a user.

2. Description of the Background Art

To distribute DVDs with video recorded thereon, the following two methods have been mainly utilized.

One is selling such DVDs each at an appropriate price. This is similar to selling music CDs and video-recorded cassettes.

The other is lending the DVDs through video-rental shops often found in cities. In this case, similarly to video-cassette rental, the video-rental shop sets a rental fee in advance for each DVD. This fee is calculated based on a value of the video recorded on the DVD and a rental period. A user rents a DVD from a video-rental shop, and, in turn, pays the fee set in the above-described manner to the rental shop.

Conventionally, there have been two types of DVDs: read-only DVD-ROMs (DVDs are generally referred to these DVD-ROMs) and readable/writable DVD-RAMs.

On the other hand, apparatuses for playing-back video recorded on DVDs are typified by DVD players, such as DVD-A700, and computer apparatuses incorporated with a DVD-ROM drive, such as LK-RV8171DZ, both manufactured by Matsushita Electric Industrial Co., Ltd.

Apparatuses for recording video on DVDs are typified by computer apparatuses incorporated with a DVD-RAM drive, such as LF-D102JD, also manufactured by the same company.

In conventional ground wave broadcasting, a broadcast station broadcasts commercial messages (CM) between programs, and collects advertising fees from advertisers. That is, the ground wave broadcasting service conventionally has its financial source in advertising revenues from advertisers. Therefore, viewers can view programs for free of charge.

In the conventional DVD rental method, however, as stated above, users who rent the DVD have to bear all costs for the value of the video recorded on the DVDs.

Some video cassettes and DVDs for rental have movie previews and CMs for a variety of merchandise and services recorded thereon before and/or after the main video such as a movie.

Such CMs may have some advertising effectiveness immediately after the video cassettes and DVDs are released for rental. However, such advertising effectiveness will fade away with time. For some CMs, their effectiveness completely disappears even a single day after a specific day passes.

As such, in the conventional DVD rental method, the advertising effectiveness of the CMs recorded on the rental DVDs does not last long. Therefore, rental shops or DVD software providers cannot collect sufficient advertising revenues from advertisers. In other words, with the conventional DVDs, DVD recording apparatuses, and DVD players, CMs recorded on DVDs for rental cannot be highly-effective.

Therefore, conventionally, video-rental shops, as lenders, have no other choice but to charge the user, as renters, for almost all of the cost of the value of the video recorded on the DVD as a rental fee.

If advertising fees can be increased enough to sufficiently reduce the rental fee, the number of video-rental users will be greatly increased. Also, the sales of DVD-related equipment such as DVD players are expected to be greatly promoted, accordingly.

SUMMARY OF THE INVENTION

Therefore, an object of the present invention is to provide a DVD rental system and method that can have a user (renter) view video and sound recorded on a DVD together with CMs with high advertising effectiveness and, as a result, can sufficiently reduce a rental fee to be charged to the user.

The present invention has the following features to achieve the object above.

A first aspect of the present invention is directed to a DVD rental system for recording software on a DVD and lending the DVD, comprising:

the DVD;

a lender DVD apparatus; and a user DVD apparatus, the DVD including a read-only ROM area with the software previously recorded therein, and a readable/writable RAM area, the lender DVD apparatus including write means for writing a control program in the RAM area of the DVD to be rented, and the user DVD apparatus including read means for reading the control program from the RAM area of the DVD, and control means for carrying out control by following the control program read by the read means, thereby achieving on the user DVD apparatus an environment for a predetermined operation when the software is read from the ROM area of the DVD.

In the above first aspect, the control program with the operation to be carried out by the user DVD apparatus written therein is recorded in the RAM area of the DVD, and provided to the user DVD apparatus. Thus, the lender can make the user DVD apparatus carry out the operation the lender desires.

For example, when the user uses the software recorded in the DVD, the user DVD apparatus is made to obtain CMs from the digital broadcasting and lets the user view the CMs. Unlike CMs recorded in advance in the DVD, the CMs obtained from the digital broadcasting always have advertising effectiveness. Thus, the lender can collect more advertising fees from a third party and, in turn, can reduce the rental fee to be charged to the user.

Furthermore, the user DVD apparatus is also made to carry out operation of generating history data indicating how many times and which CM has been played-back, and writing the generated history data in the RAM area. By referring to the history data, the lender can recognize the history of the CM playback operations carried out by the user DVD apparatus. Therefore, the lender can pay back the amount according to the CM viewing history records (how many times and which CM has been viewed) to the user. Also, the lender can sum up the CM viewing history records of all users, provide the summed-up result to a third party (advertiser, advertising agency, etc.), and collect the paid-back amount from the third party.

A second aspect of the present invention is directed to a DVD rental system for recording video and/or sound on a DVD and lending the DVD, comprising:

the DVD;
a lender DVD apparatus; and
a user DVD apparatus,
the DVD including
  a read-only ROM area with the video and/or sound previously recorded thereon, and
  a readable/writable RAM area,
the lender DVD apparatus including
  a first DVD write part for writing in the RAM area,
  a second DVD read part for reading from the RAM area,
  a write/read controller for controlling the first DVD write part and the first DVD read part, and
  a playback/recording control program storage for storing a playback/recording control program for the user DVD apparatus to carry out a predetermined playback/recording operation,
the user DVD apparatus including
  a second DVD write part for writing in the RAM area,
  a second DVD read part for reading from the RAM area and the ROM area,
  a digital broadcasting tuner for receiving digital broadcasting, and
  a playback/recording controller for controlling the second DVD write part, the second DVD read part, and the digital broadcasting tuner,
the write/read controller controlling the first DVD write part to write the playback/recording control program in the RAM area of the DVD,
the playback/recording controller
  controlling the second DVD read part to read the playback/recording control program from the RAM area of the DVD, and
  controlling, by following the read playback/recording control program, the second DVD write part, the second DVD read part, and the digital broadcasting tuner,
thereby achieving on the user DVD apparatus an environment for a playback/recording operation including
  receiving digital broadcasting and extracting a CM therefrom,
  writing the extracted CM in the RAM area,
  reading the video and/or sound from the ROM area of the DVD and the CM from the RAM area thereof in each predetermined timing for playback, and
  generating history data indicating how many times and which CM has been played-back and writing the history data in the RAM area, and
the write/read controller further controlling the first DVD read part to read the history data from the RAM area of the returned DVD.

In the above second aspect, the playback/recording control program is recorded in the RAM area of the DVD, and then provided to the user DVD apparatus. Thus, the user DVD apparatus is made to carry out the above playback/recording operation.

Unlike CMs recorded in advance in the DVD, the CMs obtained from the digital broadcasting always have advertising effectiveness. Thus, the lender can collect more advertising fees from a third party and, in turn, can reduce the rental fee to be charged to the user.

Furthermore, the user DVD apparatus is also made to carry out operation of generating history data indicating how many times and which CM has been played-back, and writing the generated history data in the RAM area. By referring to the history data, the lender can recognize the history of the CM playback operations carried out by the user DVD apparatus. Therefore, the lender can pay back the amount according to the CM viewing history records (how many times and which CM has been viewed) to the user. Also, the lender can sum up the CM viewing history records of all users, provide the summed-up result to a third party (advertiser, advertising agency, etc.), and collect the paid-back amount from the third party.

According to a third aspect, in the second aspect,
  the write/read controller adds personal data of the user to the playback/recording control program to be written in the RAM area, and
  the playback/recording controller selects the CM to be extracted based on the personal data when receiving the digital broadcasting and extracting the CM therefrom.

In the above third aspect, based on the user's personal data indicating sex, age, hobbies, preferences, etc., CMs suitable for the user and also advertising-effective for the lender are selected for viewing. Therefore, the lender can collect more advertising fees from the third party and, in turn, can greatly reduce the rental fee to be charged to the user.

A fourth aspect of the present invention is directed to a lender DVD apparatus used in a DVD rental system for recording video and/or sound on a DVD and lending the DVD,
  the DVD including
    a read-only ROM area with the video and/or sound previously recorded thereon, and
    a readable/writable RAM area,
  the lender DVD apparatus including
    a DVD write part for writing in the RAM area,
    a DVD read part for reading from the RAM area,
    a write/read controller for controlling the DVD write part and the DVD read part, and
    a playback/recording control program storage for storing a playback/recording control program for a user DVD apparatus to carry out a predetermined playback/recording operation,
  the write/read controller controlling the DVD write part to write the playback/recording control program in the RAM area of the DVD, thereby achieving on the user DVD apparatus an environment for a playback/recording operation including
    receiving digital broadcasting and extracting a CM therefrom,
    writing the extracted CM in the RAM area,
    reading the video and/or sound from the ROM area of the DVD and a CM from the RAM area thereof in each predetermined timing for playback, and
    generating history data indicating how many times and which CM has been played-back and writing the history data in the RAM area, and
  the write/read controller further controlling the DVD read part to read the history data from the RAM area of the returned DVD.

In the above fourth aspect, the playback/recording control program is recorded in the RAM area of the DVD, and then provided to the user DVD apparatus. Thus, the user DVD apparatus is made to carry out the above playback/recording operation.

Unlike CMs recorded in advance in the DVD, the CMs obtained from the digital broadcasting always have advertising effectiveness. Thus, the lender can collect more advertising fees from a third party and, in turn, can reduce the rental fee to be charged to the user.

Furthermore, by referring to the history data, the lender can recognize the history of the CM playback operations carried out by the user DVD apparatus. Therefore, the lender can pay back the amount according to the CM viewing history records (how many times and which CM has been viewed) to the user. Also, the lender can sum up the CM viewing history records of all users, provide the summed-up result to a third party (advertiser, advertising agency, etc.), and collect the paid-back amount from the third party.

According to a fifth aspect, in the fourth aspect, the write/read controller adds personal data of a user to the playback/recording control program to be written in the RAM area, thereby achieving in the user DVD apparatus an environment for a playback/recording operation in which the digital broadcasting is received and the CM to be extracted is selected based on the personal data.

In the above fifth aspect, based on the user's personal data indicating sex, age, hobbies, preferences, etc., CMs suitable for the user and also advertising-effective for the lender are selected for viewing. Therefore, the lender can collect more advertising fees from the third party and, in turn, can greatly reduce the rental fee to be charged to the user.

A sixth aspect of the present invention is directed to a user DVD apparatus used in a DVD rental system for recording video and/or sound on a DVD and lending the DVD, the DVD including
 a read-only ROM area with the video and/or sound previously recorded therein, and
 a readable/writable RAM area with a playback/recording control program recorded thereon at the time of lending, the user DVD apparatus including
 a DVD write part for writing in the RAM area,
 a DVD read part for reading from the RAM area and the ROM area,
 a digital broadcasting tuner for receiving digital broadcasting, and
 a playback recording controller for controlling the DVD write part, the DVD read part, and the digital broadcasting tuner, the playback/recording controller
 controlling the DVD read part to read the playback/recording control program from the RAM area of the DVD, and
 controlling, by following the read playback/recording control program, the DVD write part, the DVD read part, and the digital broadcasting tuner, thereby achieving on the user DVD apparatus an environment for a playback/recording operation including
 receiving digital broadcasting and extracting a CM therefrom,
 writing the extracted CM in the RAM area,
 reading the video and/or sound from the ROM area of the DVD and the CM from the RAM area thereof in each predetermined timing for playback, and
 generating history data indicating how many times and which CM has been reproduced and writing the history data in the RAM area.

In the above sixth aspect, the playback/recording control program is recorded in the RAM area of the DVD, and then provided to the user DVD apparatus. Following the program, the user DVD apparatus is made to carry out the above playback/recording operation.

Unlike CMs recorded in advance in the DVD, the CMs obtained from the digital broadcasting always have advertising effectiveness. Thus, the lender can collect more advertising fees from a third party and, in turn, can reduce the rental fee to be charged to the user.

Furthermore, by referring to the history data, the lender can recognize the history of the CM playback operations carried out by the user DVD apparatus. Therefore, the lender can pay back the amount according to the CM viewing history records (how many times and which CM has been viewed) to the user. Also, the lender can sum up the CM viewing history records of all users, provide the summed-up result to a third party (advertiser, advertising agency, etc.), and collect the paid-back amount from the third party.

According to a seventh aspect, in the sixth aspect, personal data of a user is added to the playback/recording control program written in the RAM area, and the playback/recording controller achieves an environment for a playback/recording operation of selecting the CM to be extracted based on the personal data.

In the above seventh aspect, based on the user's personal data indicating sex, age, hobbies, preferences, etc., CMs suitable for the user and also advertising-effective for the lender are selected for viewing. Therefore, the lender can collect more advertising fees from the third party and, in turn, can greatly reduce the rental fee to be charged to the user.

An eighth aspect of the present invention is directed to a recording medium on which a playback/recording control program is recorded, the playback/recording control program to be executed in a user DVD apparatus used in a DVD rental system for recording video and/or sound on a DVD and lending the DVD, the DVD including
 a read-only ROM area with the video and/or sound previously recorded thereon, and
 a readable/writable RAM area in which the playback/recording control program is written at the time of lending, the playback/recording control program for achieving on the user DVD apparatus an environment for a playback/recording operation including the steps of:
 receiving digital broadcasting and extracting a CM therefrom;
 reading the video and/or sound from the ROM area and the CM from the RAM area in each predetermined timing for playback, and
 generating history data indicating how many times and which CM is played-back and writing the history data in the RAM area.

In the above eighth aspect, the playback/recording control program recorded in the recording medium is read therefrom, recorded in the RAM area of the DVD, and then provided to the user DVD apparatus. Following the program, the user DVD apparatus is made to carry out the above playback/recording operation.

Unlike CMs recorded in advance in the DVD, the CMs obtained from the digital broadcasting always have advertising effectiveness. Thus, the lender can collect more advertising fees from a third party and, in turn, can reduce the rental fee to be charged to the user.

Furthermore, by referring to the history data, the lender can recognize the history of the CM playback operations carried out by the user DVD apparatus. Therefore, the lender can pay back the amount according to the CM viewing history records (how many times and which CM has been viewed) to the user. Also, the lender can sum up the CM viewing history records of all users, provide the summed-up result to a third party (advertiser, advertising agency, etc.), and collect the paid-back amount from the third party.

According to a ninth aspect, in the eighth aspect, personal data of a user is further written in the RAM area at the time of lending, and in the extracting step, the CM to be extracted is selected based on the personal data.

In the above ninth aspect, based on the user's personal data indicating sex, age, hobbies, preferences, etc., CMs suitable for the user and also advertising-effective for the lender are selected for viewing. Therefore, the lender can collect more advertising fees from the third party and, in turn, can greatly reduce the rental fee to be charged to the user.

A tenth aspect of the present invention is directed to a DVD rental method for recording video and/or sound on a DVD and lending the DVD, the DVD including
a read-only ROM area with the video and/or sound previously recorded therein, and
a readable/writable RAM area, wherein
a lender writes, in the RAM area of the DVD to be rented, a playback/recording control program for making a DVD apparatus for a user to carry out a predetermined playback/recording operation,
the user pays a fee for a value of the video and/or sound to the lender,
the DVD apparatus for the user
reads the playback/recording control program from the RAM area of the DVD, and
by following the read play-recording/control program, carries out the playback/recording operation including
receiving digital broadcasting and extracting a CM therefrom,
writing the extracted CM in the RAM area,
reading the video and/or sound from the ROM area of the DVD and the CM from the RAM area thereof in each predetermined timing for playback, and
generating history data indicating how many times and which CM has been played-back and writing the history data in the RAM area, and
when the DVD is returned from the user, the lender
reading the history data from the RAM area of the DVD,
paying an amount to the lender by referring to CM playback history, and
providing the history data to a third party and charging the third party for the history data to collect the fee paid to the user.

In the above tenth aspect, the playback/recording control program is recorded in the RAM area of the DVD, and then provided to the user DVD apparatus. Thus, the user DVD apparatus is made to carry out the above playback/recording operation.

Unlike CMs recorded in advance in the DVD, the CMs obtained from the digital broadcasting always have advertising effectiveness. Thus, the lender can collect more advertising fees from a third party and, in turn, can reduce the rental fee to be charged to the user.

Furthermore, by referring to the history data, the lender can recognize the history of the CM playback operations carried out by the user DVD apparatus. Therefore, the lender can pay back the amount according to the CM viewing history records (how many times and which CM has been viewed) to the user. Also, the lender can sum up the CM viewing history records of all users, provide the summed-up result to a third party (advertiser, advertising agency, etc.), and collect the paid-back amount from the third party.

According to an eleventh aspect, in the tenth aspect, the lender adds personal data of the user to the playback/recording control program to be written in the RAM area, and the DVD apparatus for the user selects a CM to be extracted based on the personal data.

In the above eleventh aspect, based on the user's personal data indicating sex, age, hobbies, preferences, etc., CMs suitable for the user and also advertising-effective for the lender are selected for viewing. Therefore, the lender can collect more advertising fees from the third party and, in turn, can greatly reduce the rental fee to be charged to the user.

These and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention is now described below with reference to the drawings.

Figure 1:
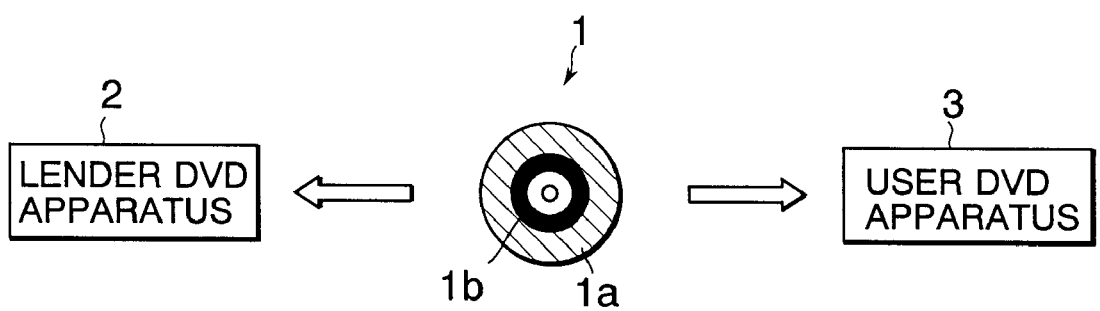
FIG. 1 is a block diagram showing the structure of a DVD rental system according to one embodiment of the present invention.

FIG. 1 is a block diagram showing the structure of a DVD rental system according to the embodiment of the present invention.

In FIG. 1, the DVD rental system according to the embodiment of the present invention is structured by a DVD 1, a lender DVD apparatus 2, and a user (renter) DVD apparatus 3.

The DVD 1 includes a ROM area (read-only area) 1a and a RAM area (writable/readable area) 1b. In the ROM area 1a, video and sound accompanied therewith (hereinafter collectively referred to as "video") are previously stored. Note that video mentioned herein indicates video and audio signals that have been digitized and then encoded with MPEG.

Also note that the DVD 1 shown is only an example, and how ROM area 1a and the RAM area 1b are arranged thereon is not limited to the one shown in FIG. 1.

The lender DVD apparatus 2 is placed in a shop where the DVD 1 is rented and returned (hereinafter, rental shop). The lender DVD apparatus 2 records a playback/recording control program in the RAM area 1b of the DVD 1 to be rented. The playback/recording control program is used for letting the user DVD apparatus 3 play back CMs and record history data indicating a history of CM playback operations. The lender DVD apparatus 2 also reads the history data from the RAM area 1b of the DVD 1 that has been returned.

The user DVD apparatus 3 is placed in a user's house or carried by the user. The user DVD apparatus 3 reads video from the ROM area 1a of the rented DVD 1 for playback. The user DVD apparatus 3 also reads the playback/recording control program from the RAM area 1b. Following the read program, the user DVD apparatus 3 carries out CM playback and related operation, which will be described below.

First, the user DVD apparatus 3 receives digital broadcasting, extracts therefrom a commercial message (hereinafter, CMs) that satisfy predetermined conditions, and then stores the CMs in the RAM area 1b. Then, the user DVD apparatus 3 plays-back the CMs stored in the RAM area 1b in predetermined timing. Then, the user DVD apparatus 3 generates history data indicating a history of CM playback operations, that is, how many times and which CM has been played-back, and records the history data in the RAM area 1b.

The operation of the DVD rental system as structured above is described below.

Figure 2:
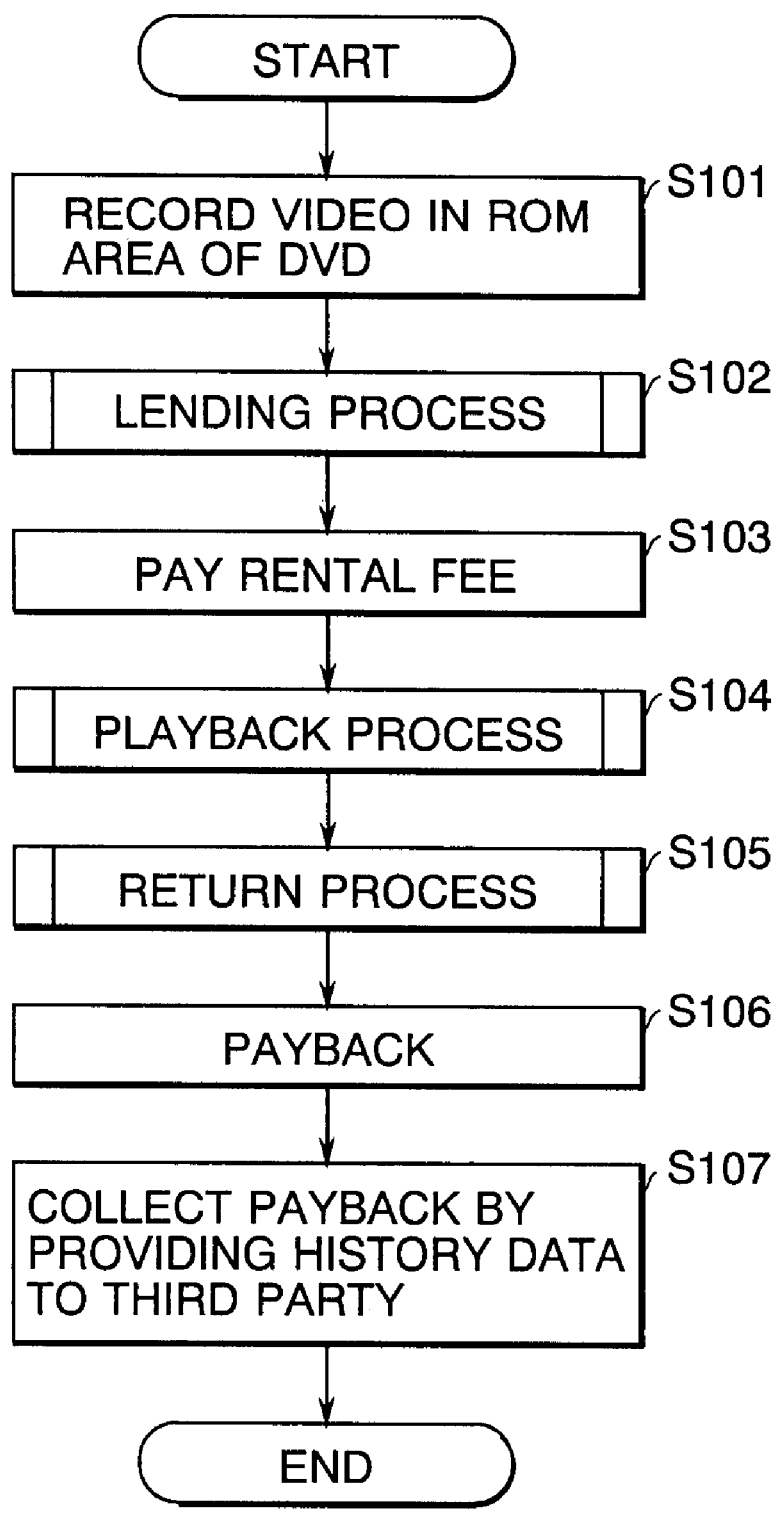
FIG. 2 is a flow chart showing one example of a DVD video rental method using the DVD rental system of FIG. 1.

FIG. 2 is a flow chart showing one example of a DVD video rental method using the DVD rental system of FIG. 1.

In FIG. 2, video such as a movie and music program is first recorded in the ROM area 1a of the DVD 1 shown in FIG. 1 (step S101). This video recording process in step S101 is previously done in a DVD software provider. In other words, the DVD 1 provided by the DVD software provider to the rental shop has video previously recorded in the ROM area 1a thereof and nothing recorded (or initial data recorded) in the RAM area 1b thereof.

On the other hand, the user is provided in advance with a magnetic card (as indicated by a reference numeral 28 in FIG. 3) as a member's card. On the magnetic card 28, an ID for identifying the user and personal data such as age, sex, hobby, preferences, and others are recorded.

The rental shop displays cases for accommodating the above-described DVDs 1. Each case a is labeled with a title, contents, cast, and other information about video recorded in the DVD 1. The user refers to this information to select his/her favorite DVD 1. Then, the user brings a case (or a number tag attached thereto) for the selected DVD 1 and the above magnetic card 28 to a salesclerk.

In response, the salesclerk retrieves the DVD 1 corresponding to the case or number tag from a shelf. The salesclerk then sets the retrieved DVD 1 and the received magnetic card 28 into the lender DVD apparatus 2.

Once the salesclerk presses an enter key not shown, the lender DVD apparatus 2 executes a lending process for recording the playback/recording control program in the RAM area 1b of the DVD 1 (step S102).

Here, the lending process of step S102 is described in detail.

Figure 3:
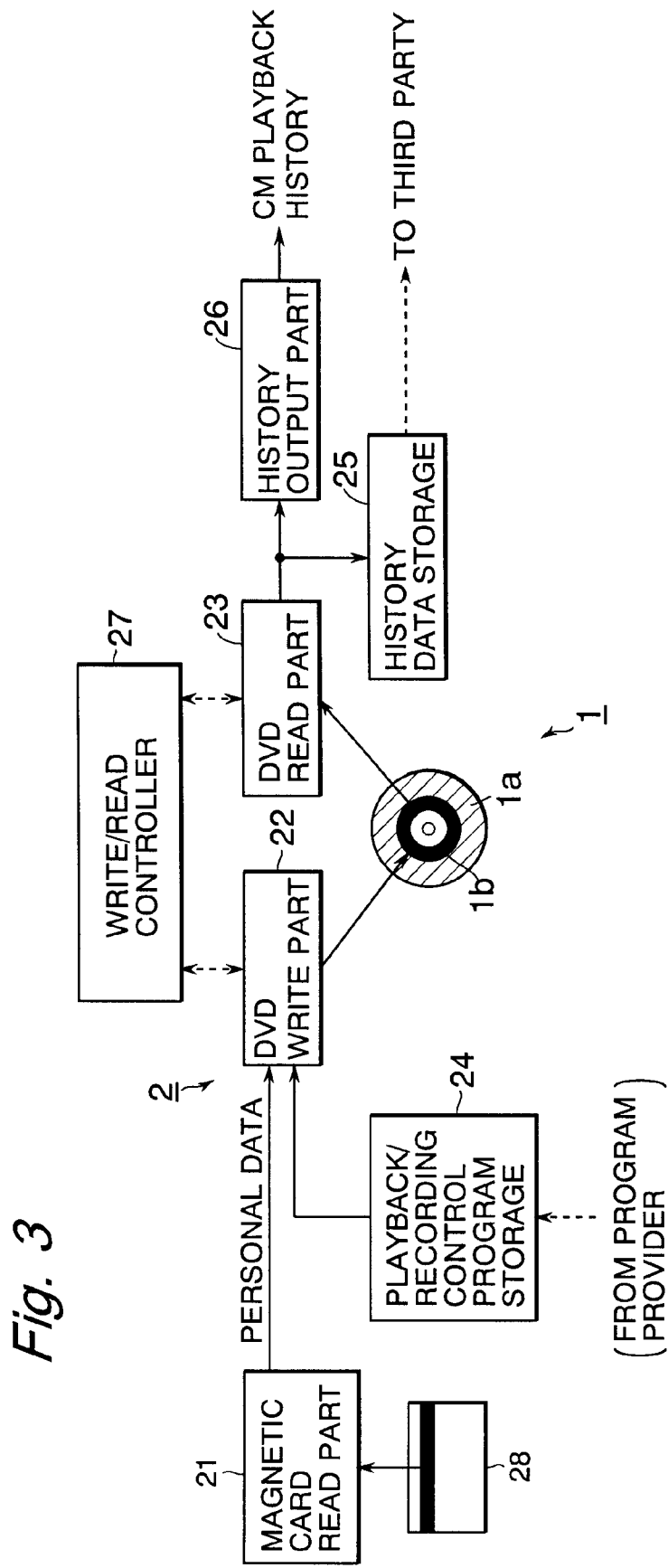
FIG. 3 is a block diagram showing one example of the structure of a lender DVD apparatus 2 of FIG. 1.
Figure 4:
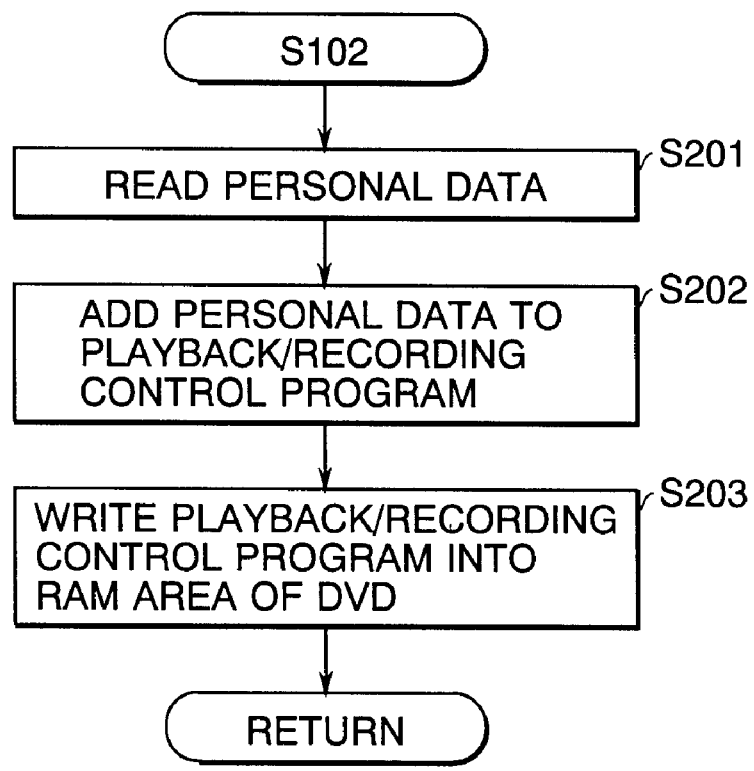
FIG. 4 is a flow chart showing one example of a lending process of step S102 in FIG. 2.

FIG. 3 is a block diagram showing one example of the structure of the lender DVD apparatus 2 of FIG. 1. FIG. 4 is a flow chart showing one example of the lending process in step S102 of FIG. 2.

In FIG. 3, the lender DVD apparatus 2 includes a magnetic card read unit 21, a DVD write unit 22, a DVD read unit 23, a playback/recording control program storage 24, a history data storage 25, a history output unit 26, and a write/read controller 27.

The magnetic card read part 21 reads the personal data from the magnetic card 28. The playback/recording control program storage 24 stores the playback/recording control program. The DVD write part 22 fetches the playback/recording control program from the playback/recording control program storage 24, and adds the read personal data thereto. The DVD write part 22 then writes the playback/recording control program with the personal data added thereto in the RAM area 1b of the DVD 1 to be rented. The DVD read part 23 reads the history data from the RAM area 1b of the DVD 1 returned to the shop. The history data storage 25 stores the read history data. The history output part 26 converts the read history data into character data for output. The write/read controller 27 controls the DVD write part 22 and the DVD read part 23.

Here, the above playback/recording control program is provided to the lender DVD apparatus 2 as being stored in a recording medium such as a DVD or CD-ROM or through a network, and then stored in the playback/recording control program storage 24.

Figure 5:
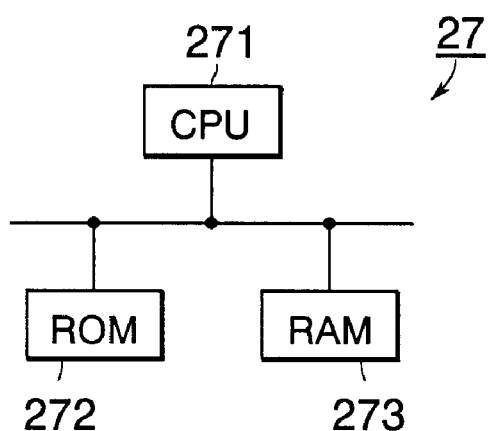
FIG. 5 is a block diagram showing a hardware structure of a write/read controller 27 of FIG. 3.

FIG. 5 is a block diagram showing a hardware structure of the write/read controller 27 of FIG. 3.

In FIG. 5, the write/read controller 27 includes a CPU 271, ROM 272, and RAM 273. In the ROM 272, a write/read control program is stored in advance. The CPU 271 follows this write/read control program to operate. With the CPU's operation, the write/read controller 27 can execute a write/read control process as will be described later. In the RAM 273, various data and programs required for the operation of the CPU 271 are temporarily stored.

With reference to the flow chart of FIG. 4, the lending process carried out by the lender DVD apparatus 2 as structured above is now described.

First, the magnetic card read part 21 reads the personal data from the magnetic card 28 set in the lender DVD apparatus 2 (step S201).

Then, the write/read controller 27 fetches the playback/recording control program from the playback/recording control program storage 24, and adds the personal data read in step S201 to the program (step S202). Then, the write/read controller 27 instructs the DVD write part 22 to write the playback/recording control program with the personal data added thereto in the RAM area 1b of the DVD 1 (step S203).

The lending process in step S102 is now complete.

Referring back to FIG. 2, the DVD 1 that has been subjected to the above lending process is rented from the rental shop to the user. From the user to the rental shop, a rental fee according to the value and rental period of the video recorded in the DVD 1 is paid (step S103).

Then, the user brings the rented DVD 1 home, for example, and sets the DVD 1 into the user DVD apparatus 3 to play back the video recorded in the ROM area 1a of the DVD 1 (step S104).

Here, the playback process in step S104 is described in detail.

Figure 6:
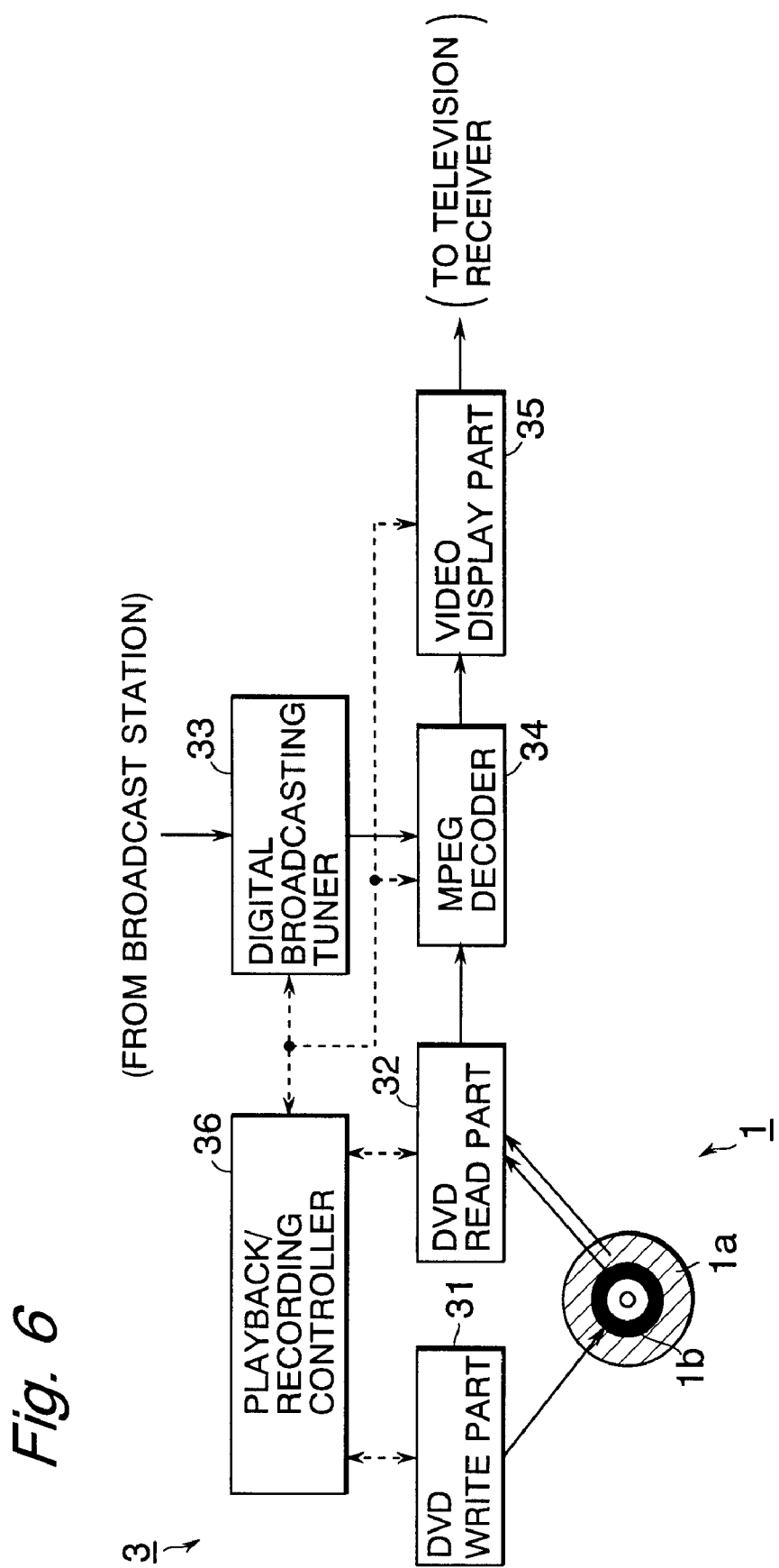
FIG. 6 is a block diagram showing one example of a user DVD apparatus 3 of FIG. 1.
Figure 7:
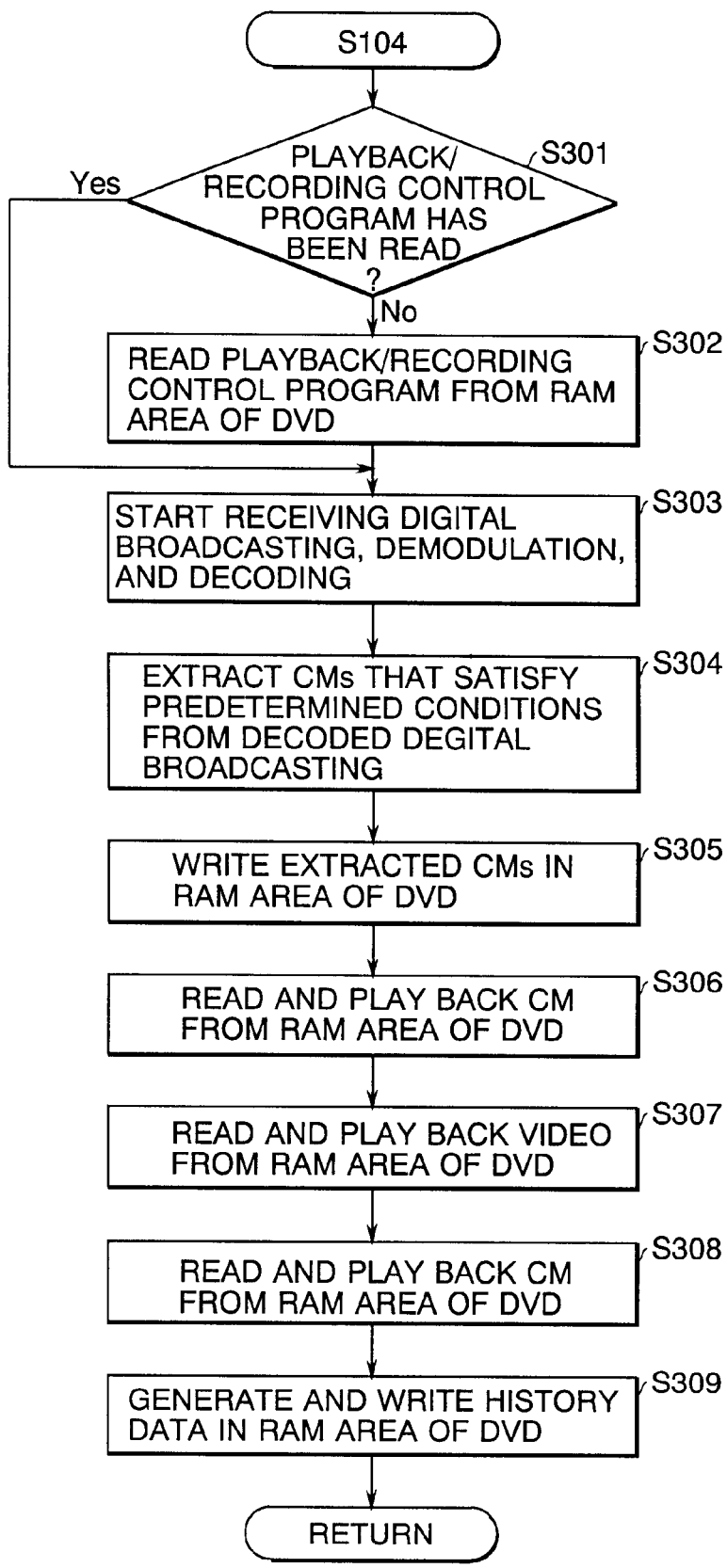
FIG. 7 is a flow chart showing one example of a playback process of step S104 in FIG. 2.

FIG. 6 is a block diagram showing one example of the structure of the user DVD apparatus 3 shown in FIG. 1. FIG. 7 is a flow chart showing one example of the playback process in step S104 of FIG. 2.

In FIG. 6, the user DVD apparatus 3 includes a DVD write part 31, a DVD read part 32, a digital broadcasting tuner 33, an MPEG decoder 34, a video display part 35, and a playback/recording controller 36.

The DVD read part 32 reads the video from the ROM area 1a of the rented DVD 1, and also reads the playback/recording control program from the RAM area 1b thereof. The DVD write part 31 writes history data in the RAM area 1b of the rented DVD 1. The digital broadcasting tuner 33 receives and demodulates digital broadcasting. The MPEG decoder 34 decodes the video read from the DVD 1 and the received and demodulated digital broadcasting. The video display part 35 converts the decoded video and digital broadcasting into video signals, and outputs the video signals to a television receiver (not shown). The playback/recording controller 36 controls each of the above-described components of the user DVD apparatus 3.

Figure 8:
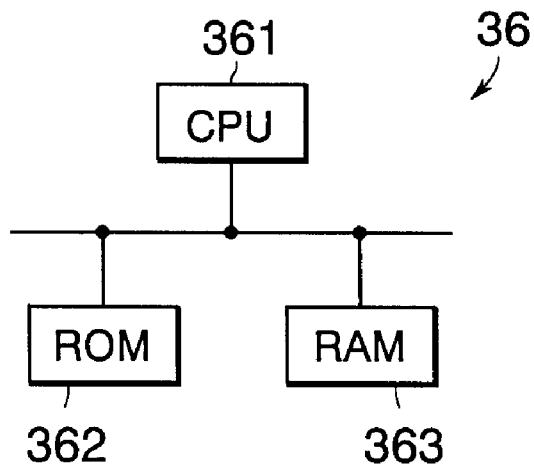
FIG. 8 is a block diagram showing a hardware structure of a playback/recording controller 36 of FIG. 6.

FIG. 8 is a block diagram showing a hardware structure of the playback/recording controller 36 of FIG. 6.

In FIG. 8, the playback/recording controller 36 includes a CPU 361, ROM 362, and RAM 363. In the ROM 362, an initial transfer control program is stored in advance. Written in this initial transfer control program is a procedure for, when the DVD 1 is first set into the user DVD apparatus 3, reading the playback/recording control program from the RAM area 1b of the DVD 1 and transferring the program to the RAM 363.

When the DVD 1 is first set into the user DVD apparatus 3, the CPU 361, following the initial transfer control program stored in the ROM 362, reads the playback/recording control program from the RAM area 1b of the DVD 1, and transfers the program to the RAM 363. Thereafter, the CPU 361 operates by following the playback/recording control program stored in the RAM 363. This operation enables the playback/recording controller 36 to achieve a playback/recording control process as will be described later.

With reference to the flow chart of FIG. 7, the playback process carried out by the above-structured user DVD apparatus 3 is now described.

When the rented DVD 1 is set into the user DVD apparatus 3, the playback/recording controller 36 first determines whether the playback/recording control program recorded in the RAM area 1b of the DVD 1 has been read or not (step S301). If Yes, the procedure goes to step S303.

If No in step S301, the playback/recording controller 36 instructs the DVD read part 32 to read the playback/recording control program from the RAM area 1b of the DVD 1 (step S302).

The playback/recording controller 36 then instructs the digital broadcasting tuner 33 and the MPEG decoder 34 to start receiving and demodulating digital broadcasting and then decoding the demodulated digital broadcasting (step S303).

The playback/recording controller 36 then extracts only CMs that satisfy predetermined conditions from the decoded digital broadcasting (step S304). Then, the DVD write part 31 writes the extracted CM into the RAM area 1b of the DVD 1 (step S305).

Here, a CM extraction process in step S304 can be carried out as follows, for example.

In digital broadcasting, an identifier is provided for each program and CM in its header portion for identification. Therefore, if a table including the identifiers and contents of the CMs to be broadcast is provided in advance, the CMs that satisfy certain conditions can be extracted from the decoded digital broadcasting by referring to the table.

Note that a CM code dedicated to the system of FIG. 1 may be used for CM extraction instead of the already-existing identifier as stated above. The CM code is structured by identification data for identifying each CM and content data indicating the contents of the CMs.

Also note that the above predetermined conditions may be determined based on the user's personal information that have been added to the playback/recording control program.

For example, if the user is female, the conditions may be "cosmetics" and "women's wear and accessories". If male, they maybe "car" and "men'swear and accessories". If the user's hobby is "sports", the conditions may be "sport facilities and equipment". If "travel", they may be "accommodations and travel goods". Furthermore, if the user is over a certain age, CMs of a specific genre may be extracted.

Referring back to FIG. 7, the user then presses a PLAY button (not shown) to make an instruction for starting playback. In response, the playback/recording controller 36 instructs the DVD read part 32, the MPEG decoder 34, and the video display part 35 to execute a CM playback process as follows. That is, the CM recorded in step S302 is read from the RAM area 1b of the DVD 1, and the decoded CM is converted into video signals for output to the television receiver (step S306). This CM playback process ends after a predetermined number of CMs, for example, six CMs (their total time is 1 and a half minutes) are played-back.

Here, there may be some cases where the CM recording process in step S305 has not yet been complete when the user presses the PLAY button, and therefore the CM to be played-back does not exist in the RAM area 1b of the DVD 1. To solve this problem, the following three methods can be used.

In a first method, in the lending process in step S102 (refer to FIG. 2), a predetermined number of CMs are recorded in advance as initial data in the RAM area 1b of the DVD 1. In this case, CMs that do not depend on the user's sex, age, and other factors, that is, CMs for upcoming DVD software and foods, for example, are recorded.

In a second method, the CMs recorded in the RAM area 1b at the previous lending is undeleted and kept for playback until new CMs are recorded. In this case, the CMs to be played-back are not necessarily appropriate to the current user. However, no additional processes are required unless the DVD 1 is brand-new.

In a third method, the CM recording process in step S305 and the CM playback process in step S306 are simultaneously carried out. In this case, the DVD write part 31 and the DVD read part 32 both require double-speed or more capabilities.

Referring back to FIG. 7, the playback/recording controller 36 instructs the DVD read part 32, the MPEG decoder 34, and the video display part 35 to execute a video playback process as follows. That is, the video is read from the ROM area 1a of the DVD 1, decoded, and then converted into video signals for output to the television receiver (step S307). After the whole video has been played-back, this video playback process ends.

Then, the playback/recording controller 36 instructs the DVD read part 32, the MPEG decoder 34, and the video display part 35 to execute a CM playback process as follows. That is, the CM recorded in step S305 is read from the RAM area 1b of the DVD 1, decoded, and then converted into video signals for output to the television receiver (step S308). This CM playback process continues until the user presses a STOP button to make an instruction for ending playback.

Note that the CM to be played-back in step S308 may be the same as the CM played-back in step S306 or may be different therefrom.

Furthermore, it is more preferable that a procedure for determining the order of playing-back the CMs recorded in the RAM area 1*b*, how many times and which CM is to be played-back, and other factors is written in the playback/recording control program.

The playback/recording controller 36 then generates, in steps S306 and S308, history data indicating how many times and which CM has been played-back. The playback/recording controller 36 then instructs the DVD write part 31 to write the generated history data in the RAM area 1*b* of the DVD 1 (step S309).

The playback process in step S104 shown in FIG. 2 is now complete.

Referring back to FIG. 2, the user brings the DVD 1 with the history data recorded in the RAM area thereof in the above-described manner for return to the rental shop. In response, the salesclerk sets the returned DVD 1 into the lender DVD apparatus 2.

Then, when the enter key, not shown, is pressed, the lender DVD apparatus 2 executes a return process for reading the history data from the RAM area 1*b* of the DVD 1 and storing the read history data (step S105).

Here, the return process of step S105 is described in detail.

The structure of the lender DVD apparatus 2 is shown in FIG. 3, and the functions of the components thereof have been already described (refer to the description for step S102).

Figure 9:
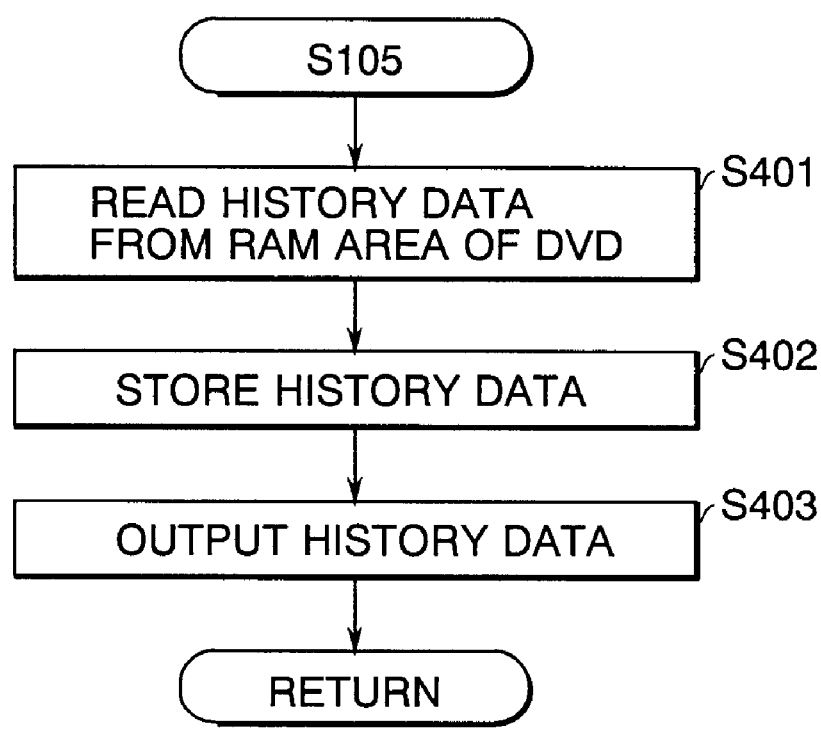
FIG. 9 is a flow chart showing one example of a return process of step S105 in FIG. 2.

FIG. 9 is a flow chart showing one example of the return process of step S105 in FIG. 2.

With reference to the flow chart of FIG. 9, the return process carried out by the above-structured lender DVD apparatus 2 is now described.

Once the returned DVD 1 is set into the lender DVD apparatus 2, the write/read controller 27 instructs the DVD read part 23 to read the history data from the RAM area 1*b* of the DVD 1 (step S401), and to provide the read history data to the history output part 26 and the history data storage 25.

In response, the history data storage 25 stores the history data read in step S401 (step S402). On the other hand, the history output part 26 outputs the history data read in step S401 in a visually-recognizable form such as characters, figures, and tables (step S403).

The return process of step S105 is now complete.

Referring back to FIG. 2, the salesclerk refers to the history data outputted as in the above-described form to check how many times and which CM has been played-back in the user DVD apparatus 3. With reference to CM viewing history records, the salesclerk pays some money back to the user (step S106). That is, part or all of the rental fee paid in step S103 by the user is paid back to the user with reference to the CM viewing history records.

Here, part or all of the rental fee paid may be paid back in cash, or a payback amount is deducted from a rental fee for the next rental. Alternatively, the above CM viewing history records may be converted into points for accumulation, and a free gift may given to the user according to earned points.

Then, the history data stored in the history data storage 25 of the lender DVD apparatus 2 is provided from the rental shop to a third party. From the third party to the rental shop, the price of the history data, that is, an amount of money according to the total of the CM viewing history records, is paid as an advertising fee. More specifically, the rental shop and the third party make an advertisement contract in advance, and the rental shop (that is, the lender of the DVD 1) provides the history data indicating the CM viewing history records to the third party. Thus, the rental shop collects the amount paid back in step S106 to the user (that is, renter) (step S107).

Here, examples of the above third party include a manufacturer of a product for the CM, and an advertisement agency that creates the CM.

For example, to provide the history data from the rental shop to the third party, the lender DVD apparatus 2 placed in the rental shop and a computer apparatus (not shown) placed in the third party may be connected to each other through a network. Through this network, the history data is provided. Alternatively, the history data may be provided as being stored in a recording medium such as a DVD or CD-ROM.

As stated above, according to the present invention, the playback/recording control program in which the playback/recording operation to be carried out by the user DVD apparatus 3 is written is recorded in the RAM area 1*b* of the DVD 1, and then provided to the user DVD apparatus 3. Thus, the user DVD apparatus 3 can be made to carry out the playback/recording operation that is desired by the lender.

As one example, in the present embodiment, the playback/recording operation that the user DVD apparatus 3 is made to carry out is as follows. That is, firstly, the user DVD apparatus 3 receives digital broadcasting, extracts CMs therefrom, and writes the extracted CMs in the RAM area 1*b*. Then, the user DVD apparatus 3 reads video from the ROM area 1*a* and the CMs from the RAM area 1*b* for playback. Then, the user DVD apparatus 3 generates history data indicating how many times and which CM has been played-back, and writes the generated history data in the RAM area 1*b*.

Unlike CMs previously recorded in the DVD 1, the CMs from digital broadcasting in the above-described manner always have advertising effectiveness. Therefore, the lender can collect more fees from the third party and, in turn, can reduce the rental fee to be charged to the user.

Moreover, by referring to the history data, the lender can know the history of the CM playback operations carried out by the user DVD apparatus 3. Therefore, some amount can be paid back to the user with reference to the CM viewing history records (how many times and which CM has been viewed). Also, the CM viewing history records of all users can be summed and then provided to the third party (advertiser, advertising agency, and others) for collecting the above paid-back amount therefrom.

Furthermore, based on the user's personal data indicating sex, age, hobbies, preferences, etc., CMs suitable for the user and also advertising-effective for the lender are selected for viewing. Therefore, the lender can collect more advertising fees from the third party and, in turn, can greatly reduce the rental fee to be charged to the user.

Note that, in the present embodiment, video is recorded in the ROM area 1*a* of the DVD 1 by the DVD software provider. Alternatively, video may be recorded therein by the rental shop.

More specifically, step S101 of FIG. 2 is executed at the rental shop. In this case, the DVD software provider provides only a single master DVD (read-only) to the rental shop. At the rental shop, the video is read from the master DVD and recorded in the ROM area 1*a* of the DVD 1 for rental to users.

For this purpose, the DVD write part 22 incorporated in the lender DVD apparatus 2 (refer to FIG. 3) is required to have a function of writing not only in the RAM area 1b of the DVD 2 but also in the ROM area 1a thereof.

Thus, the user never comes upon an inconvenient situation where all DVDs with desired video recorded thereon have been rented and therefore cannot be rented. Also, the rental shop can eliminate the risk of carrying a large inventory of unrented DVDs 1.

Still further, in the present embodiment, the CMs to be played-back in the user DVD apparatus 3 are obtained through digital broadcasting. Alternatively, the rental shop may obtain and record the CMs in the RAM area 1b of the DVD 1, and lend the CM-recorded DVD 1.

For this purpose, for example, the lender DVD apparatus 2 of FIG. 3 is further provided with a CM storage (not shown) for storing CMs. The CMs to be stored therein are obtained through digital broadcasting (in this case, the lender DVD apparatus 3 is further provided with the digital broadcasting tuner 33) or directly from advertisers (in this case, the CM storage and a computer apparatuses of the advertisers are connected to each other through a network).

Still further, in the present embodiment, CMs are played-back only twice, that is, before and after video playback. Alternatively, CMs may be played-back as appropriate in the course of video playback.

That is, when viewing a movie of over two hours, most users briefly stop playback once or twice to take a break. Therefore, CM playback is made before video playback starts again after a brief stop.

For this purpose, the playback/recording control program is partly changed to make the user DVD apparatus 3 execute CM playback before video playback starts again after a brief stop.

In addition to the above, an appropriate change in the playback/recording control program enables the user DVD apparatus 3 to execute versatile CM playback.

Still further, what the user DVD apparatus 3 can be made to execute is not limited to CM playback. For example, a survey may be conducted by questionnaires about various products before or after video playback. In this case, the lender provides questionnaire results to the third party (manufacturer and dealer of the product), and can receive some survey fees therefrom.

Still further, in the present embodiment, CMs are played-back before and after video playback. Alternatively, the video and CMs may be simultaneously played-back.

That is, a television screen is divided into two areas, right and left, for example, one area displaying the video while the other displaying the CMs. Alternatively, the video may be displayed in a window form at the center of the television screen, while the CMs are displayed by using an outer area of the window.

Still further, in the present embodiment, the CMs are necessarily played-back before and after video playback. Alternatively, the user may skip CM playback.

That is, in step S104 of FIG. 2, the user can select in advance whether to execute or skip CM playback. In this case, if CM playback is skipped, this skip is reflected on the history data, causing the payback process in step S106 not to be executed.

Still further, in the present embodiment, video and its accompanying sound are recorded in the ROM area 1b of the DVD 1 for rental. Alternatively, only the sound may be recorded in the ROM area 1b of the DVD 1 for rental (so-called DVD audio).

Still further, video game and other software may be recorded in the ROM area 1b of the DVD 1 for rental. In this case, a video game processing circuit not shown has to be further provided to the user DVD apparatus 3 of FIG. 6.

While the invention has been described in detail, the foregoing description is in all aspects illustrative and not restrictive. It is understood that numerous other modifications and variations can be devised without departing from the scope of the invention.

What is claimed is:

1. A digital versatile disc rental system for recording software on a digital versatile disc and lending said digital versatile disc, said digital versatile disc rental system comprising:

said digital versatile disc including a read-only ROM area with the software previously recorded therein, and a readable/writable RAM area;

a lender digital versatile disc apparatus including write means for writing a control program in said RAM area of said digital versatile disc to be rented; and a user digital versatile disc apparatus including read means for reading the control program from said RAM area of said digital versatile disc, and control means for carrying out control by following the control program read by said read means, thereby achieving on said user digital versatile disc apparatus an environment for a predetermined operation when the software is read from said ROM area of said digital versatile disc.

2. The digital versatile disc rental system according to claim 1, wherein the predetermined operation includes reading at least one of video and sound from said ROM area and a commercial message from said RAM area in each predetermined timing for playback.

3. The digital versatile disc rental system according to claim 1, wherein the predetermined operation includes
receiving digital broadcasting and extracting a commercial message therefrom,
writing the extracted commercial message in said RAM area, and
reading at least one of video and sound from said ROM area and a commercial message from said RAM area in each predetermined timing for playback.

4. The digital versatile disc rental system according to claim 1, wherein the predetermined operation includes
receiving digital broadcasting and extracting a commercial message therefrom,
writing the extracted commercial message in said RAM area,
reading at least one of video and sound from said ROM area and a commercial message from said RAM area in each predetermined timing for playback, and
generating history data indicating how many times and which commercial message has been played-back and writing the history data in said RAM area.

5. A digital versatile disc rental system for recording at least one of video and sound on a digital versatile disc and lending said digital versatile disc, said digital versatile disc rental system comprising:

said digital versatile disc;
a lender digital versatile disc apparatus; and
a user digital versatile disc apparatus,
said digital versatile disc including
a read-only ROM area with the at least one of video and sound previously recorded thereon, and a readable/writable RAM area, said lender digital versatile disc apparatus including
a first digital versatile disc write part for writing in said RAM area,
a first digital versatile disc read part for reading from said RAM area,
a write/read controller for controlling said first digital versatile disc write part and said first digital versatile disc read part, and
a playback/recording control program storage for storing a playback/recording control program for said user digital versatile disc apparatus to carry out a predetermined playback/recording operation, said user digital versatile disc apparatus including
a second digital versatile disc write part for writing in said RAM area,
a second digital versatile disc read part for reading from said RAM area and said ROM area,
a digital broadcasting tuner for receiving digital broadcasting, and
a playback/recording controller for controlling said second digital versatile disc write part, said second digital versatile disc read part, and said digital broadcasting tuner, said write/read controller controlling said first digital versatile disc write part to write the playback/recording control program in said RAM area of said digital versatile disc, said playback/recording controller controlling said second digital versatile disc read part to read the playback/recording control program from said RAM area said digital versatile disc, and controlling, by following the read playback/recording control program, said second digital versatile disc write part, said second digital versatile disc read part, and said digital broadcasting tuner, thereby achieving on said user digital versatile disc apparatus an environment for a playback/recording operation including
receiving the digital broadcasting and extracting a commercial message therefrom,
writing the extracted commercial message in said RAM area,
reading the at least one of video and sound from said ROM area of said and the commercial message from said RAM area thereof in each predetermined timing for playback, and
generating history data indicating how many times and which commercial message has been played-back and writing the history data in said RAM area, and
said write/read controller further controlling said first digital versatile disc read part to read the history data from said RAM area of said digital versatile disc when returned.

6. The digital versatile disc rental system according to claim 5, wherein
said write/read controller adds personal data of a user to the playback/recording control program to be written in said RAM area, and
said playback/recording controller selects the commercial message to be extracted based on the personal data when receiving the digital broadcasting and extracting the commercial message therefrom.

7. A lender digital versatile disc apparatus used in a digital versatile disc rental system for recording at least one of video and sound on a digital versatile disc and lending the digital versatile disc, the digital versatile disc including a read-only ROM area with the at least one of video and sound previously recorded thereon, and a readable/writable RAM area, said lender digital versatile disc apparatus comprising:
a digital versatile disc write part for writing in the RAM area;
a digital versatile disc read part for reading from the RAM area;
write/read controller for controlling said digital versatile disc write part and said digital versatile disc read part; and
a playback/recording control program storage for storing a playback/recording control program for a user digital versatile disc apparatus to carry out a predetermined playback/recording operation, said write/read controller controlling said digital versatile disc write part to write the playback/recording control program in the RAM area of the digital versatile disc, thereby achieving on the user digital versatile disc apparatus an environment for a playback/recording operation including
receiving digital broadcasting and extracting a commercial message therefrom,
writing the extracted commercial message in the RAM area,
reading the at least one of video and sound from the ROM area of the digital versatile disc and the commercial message from the RAM area thereof in each predetermined timing for playback, and
generating history data indicating how many times and which commercial message has been played-back and writing the history data in the RAM area, and
said write/read controller further controlling said digital versatile disc read part to read the history data from the RAM area of the returned digital versatile disc when returned.

8. The lender digital versatile disc apparatus according to claim 7, wherein
said write/read controller adds personal data of a user to the playback/recording control program to be written in the RAM area, thereby achieving in the user digital versatile disc apparatus the environment for a playback/recording operation in which the digital broadcasting is received and the commercial message to be extracted is selected based on the personal data.

9. A user digital versatile disc apparatus used in a digital versatile disc rental system for recording at least one of video and sound on a digital versatile disc and lending the digital versatile disc, the digital versatile disc including a read-only ROM area with at least one of video and sound previously recorded therein, and a readable/writable RAM area with a playback/recording control program recorded thereon at a time of the lending, said user digital versatile disc apparatus comprising:
a digital versatile disc write part for writing in the RAM area;
a digital versatile disc read part for reading from the RAM area and the ROM area;
digital broadcasting tuner for receiving digital broadcasting; and
a playback/recording controller for controlling said digital versatile disc write part, said digital versatile disc read part, and said digital broadcasting tuner, said playback/recording controller controlling said digital versatile disc read part to read the playback/recording control program from the RAM area of the digital versatile disc, and controlling, by following the read playback/recording control program, said digital versatile disc write part, said digital versatile disc read part, and said digital broadcasting tuner, thereby achieving on said user digital versatile disc apparatus an environment for a playback/recording operation including receiving the digital broadcasting and extracting a commercial message therefrom, writing the extracted commercial message in the RAM area, reading the at least one of video and sound from the ROM area of the digital versatile disc and the commercial message from the RAM area thereof in each predetermined timing for playback, and generating history data indicating how many times and which commercial message has been reproduced and writing the history data in the RAM area.

10. The user digital versatile disc apparatus according to claim 9, wherein personal data of a user is added to the playback/recording control program written in the RAM area, and said playback/recording controller achieves the environment for a playback/recording operation of selecting the commercial message to be extracted based on the personal data.

11. A recording medium on which a playback/recording control program is recorded, the playback/recording control program to be executed in a user digital versatile disc apparatus used in a digital versatile disc rental system for recording at least one of video and sound on a said recording medium and lending said recording medium, said recording medium comprising:

a read-only ROM area with the at least one of video and sound previously recorded thereon; and a readable/writable RAM area in which the playback/recording control program is written at a time of the lending, the playback/recording control program for achieving on the user digital versatile disc apparatus an environment for a playback/recording operation including:

receiving digital broadcasting and extracting a commercial message therefrom;

reading the at least one of video and sound from said ROM area and the commercial message from said RAM area in each predetermined timing for playback, and generating history data indicating how many times and which commercial message is played-back and writing the history data in the RAM area.

12. The recording medium according to claim 11, wherein personal data of a user is further written in said RAM area at a time of the lending, and in the extracting operation, the commercial message to be extracted is selected based on the personal data.

* * * * *